(12) United States Patent
Mosko (10) Patent No.: US 10,884,966 B2
(45) Date of Patent: Jan. 5, 2021

(54) METHOD AND APPARATUS TO PREVENT A NODE DEVICE FROM TRANSMITTING AN UNALLOWABLE MESSAGE ONTO A CAN BUS

(71) Applicant: Palo Alto Research Center Incorporated, Palo Alto, CA (US)

(72) Inventor: Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 30 days.

(21) Appl. No.: 16/208,699

(22) Filed: Dec. 4, 2018

(65) Prior Publication Data

US 2020/0174958 A1 Jun. 4, 2020

(51) Int. Cl.
*G06F 13/40* (2006.01)
*G06F 21/60* (2013.01)

(52) U.S. Cl.
CPC ........ *G06F 13/4027* (2013.01); *G06F 21/604* (2013.01)

(58) Field of Classification Search
CPC .............. G06F 13/4027; G06F 21/604; H04L 12/40032; H04L 12/40163; H04L 12/40104; H04L 12/4135; H04L 2012/40215
See application file for complete search history.

(56) References Cited

U.S. PATENT DOCUMENTS

| | | | |
|---|---|---|---|
| 10,216,563 B2 * | 2/2019 | Thompson | ........ H04L 12/40032 |
| 2004/0176877 A1 | 9/2004 | Hesse et al. | |
| 2015/0020152 A1 * | 1/2015 | Litichever | ............... H04L 63/08 726/1 |
| 2015/0172306 A1 * | 6/2015 | Kim | ..................... H04L 63/1425 726/23 |
| 2015/0301916 A1 * | 10/2015 | Hartwich | ............ G06F 11/3027 714/43 |
| 2016/0147563 A1 * | 5/2016 | Prakah-Asante | ....... G06F 9/546 719/314 |

(Continued)

FOREIGN PATENT DOCUMENTS

| | | |
|---|---|---|
| CN | 202424756 U | 9/2012 |
| EP | 2892199 | 7/2015 |

(Continued)

OTHER PUBLICATIONS

Corrigan, Introduction to the Controller Area Network (CAN), Texas Instruments Application Report, May 2016, pp. 1-17.

(Continued)

*Primary Examiner* — Nimesh G Patel
(74) *Attorney, Agent, or Firm* — Mueting Raasch Group (57) ABSTRACT

A first bus interface is coupled to communicate with a first controller area network (CAN) bus. A second bus interface is coupled to communicate with a node device, the node device configured to communicate with a second CAN bus. A logic circuit is coupled between the first and second bus interfaces and is operable to monitor communications by the node device via the second bus interface. If the logic circuit determines that the node device is transmitting a message that is not allowed for the node device, it prevents the message from being transmitted onto the first CAN bus in response thereto.

20 Claims, 10 Drawing Sheets

(56) References Cited

U.S. PATENT DOCUMENTS

| | | | | |
|---|---|---|---|---|
| 2017/0093866 A1* | 3/2017 | Ben-Noon | .............. | H04L 63/10 |
| 2017/0302626 A1* | 10/2017 | Yan | .................... | H04L 63/0227 |
| 2017/0305368 A1* | 10/2017 | Markham | ............... | H04W 4/40 |
| 2019/0052654 A1* | 2/2019 | Juliato | ............... | H04L 63/1416 |
| 2019/0379683 A1* | 12/2019 | Overby | .................. | H04W 4/40 |

FOREIGN PATENT DOCUMENTS

| | | |
|---|---|---|
| EP | 3128699 | 2/2017 |
| EP | 3316524 | 5/2018 |
| EP | 3358803 | 8/2018 |
| FR | 2812437 A1 | 2/2002 |

OTHER PUBLICATIONS

Emaus, "Basic CAN Bit Timing", Vector CANTech, Inc. 2010, pp. 1-9.

MilCAN Working Group, "MilCAN a Specification" MWG-MILA-001, Revision 3, May 2009, 89 pages.

Robb, "CAN Bit Timing Requirements", Freescale Semiconductor, Inc., 2004, 16 pages.

Texas Instruments, "SN65HVD233-HT 3.3-V CAN Transceiver", Jan. 2015, 36 pages.

European Search Report from EP Application No. 19213373.4 dated Mar. 10, 2020, 9 pages.

Pfeiffer, Available Editions Implementing Scalable CAN Security with CANcrypt Authentication and Encryption for the Controller Area Network and CANopen a Technology Guide, Mar. 2017, 40 pages.

\* cited by examiner

METHOD AND APPARATUS TO PREVENT A NODE DEVICE FROM TRANSMITTING AN UNALLOWABLE MESSAGE ONTO A CAN BUS

SUMMARY

The present disclosure is directed to an apparatus to prevent a node device from transmitting an unallowable message onto a controller area network bus. In one embodiment, a method, system and apparatus can utilize a first bus interface coupled to communicate with a first controller area network (CAN) bus. A second bus interface is coupled to communicate with a node device, the node device configured to communicate with a second CAN bus. A logic circuit is coupled between the first and second bus interfaces and is operable to monitor communications by the node device via the second bus interface. If the logic circuit determines that the node device is transmitting a message that is not allowed for the node device, it prevents the message from being transmitted onto the first CAN bus in response thereto.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

The present disclosure relates to embedded device networks such as those that use the Controller Area Network (CAN) bus. The CAN bus offers low-cost system device control and communications for applications such as automotive and industrial control networks. The CAN bus uses a common transmission bus and message prioritization to manage bus collisions. Each bit transmitted onto the CAN bus is either recessive or dominant. Each node reads the bus at the same time it is writing to the bus. If a node transmits a recessive bit but detects a dominant bit, it has lost arbitration and should thereafter listen on the bus and wait for the next message frame in which to attempt to retransmit.

The nodes attached to a CAN bus are configured to transmit messages with a particular arrangement of bits in the headers. The nodes with greater leading dominant bits will tend to win arbitration and have fewer transmission delays. The system designer generally decides which messages should have the highest priority, and format those messages accordingly. The system relies on each node to transmit only those messages the system designer has specified as well as to stop transmitting once arbitration has lost according to the arbitration rules.

The CAN bus has no inherent management or security features apart from what is provided on the end device that acts a node on the bus. Intrusion detect may be provided for by "sniffer" devices on the bus, but these devices cannot tell which node is misbehaving. Further, there these devices have limited means to prevent intrusion once detected. As CAN busses are being adopted in applications that need high levels of security and reliability, a way to track and negate the effects of malicious or malfunctioning nodes is desirable.

In this disclosure, a CAN device is described that creates a branch or a drop on a CAN network. This device, referred to as a Smart T-Connector (STC) has management and security features such that each drop from the CAN Bus becomes manageable, monitorable, and enforceable. The STC makes each drop manageable: one can enable, disable and view statistics for each drop. The STC can monitor and enforce a security policy, such as: minimum priority enforcement, message type and payload enforcement, and denial-of-service (DoS) prevention by inhibiting ports that lose arbitration. The STC can also use an enhanced backbone, such as CAN FD or CANCrypt, even with legacy CAN devices (e.g., CAN 2.0). Note that several STCs can be combined into a single physical concentrator, providing multiple drops and/or secondary CAN bus interfaces to which node devices can be coupled.

Figure 1:
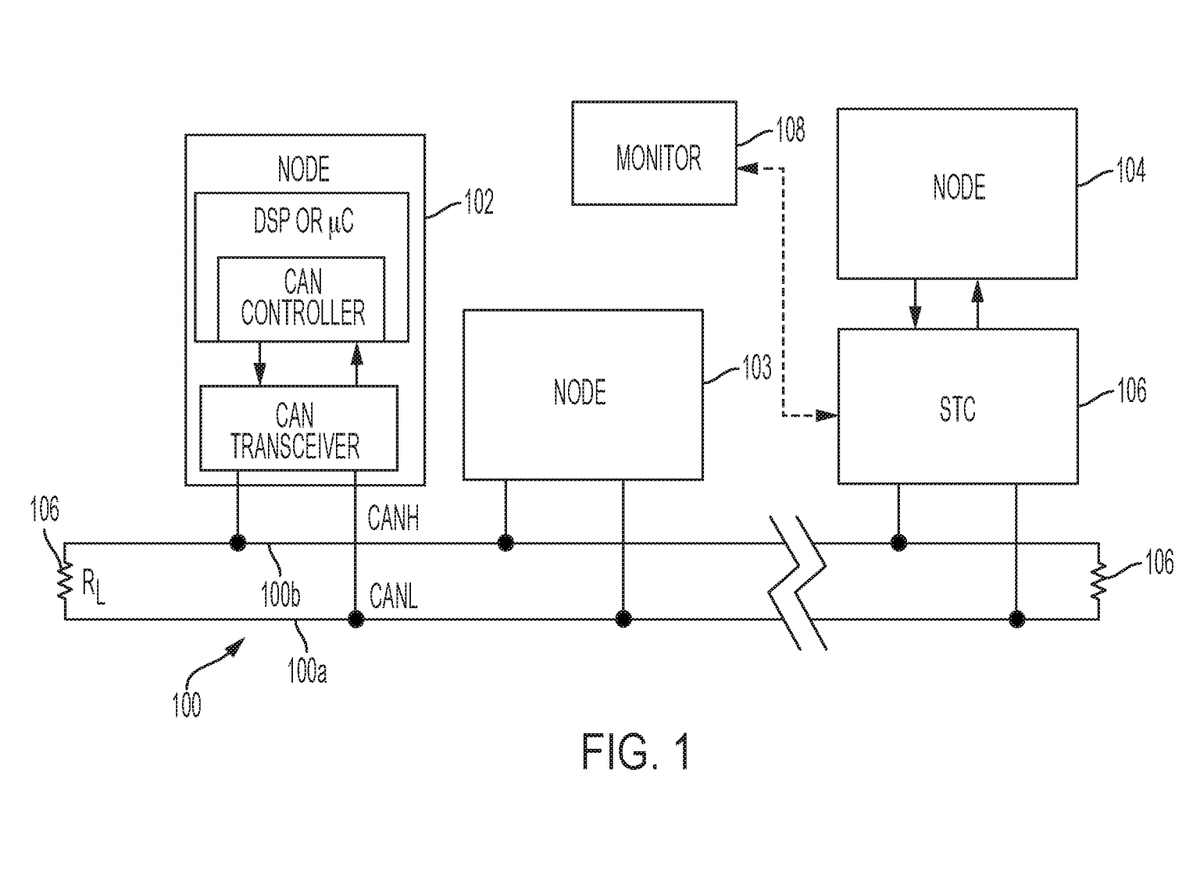
FIG. 1 is a block diagram of controller area network according to an example embodiment.

In FIG. 1, a diagram shows a CAN bus according to an example embodiment. A bus 100 includes a pair of signal lines 100$a$-$b$ that facilitates differential signaling between nodes 102-104. The signal lines 100$a$-$b$ are terminated via resistors 106 (~130 K$\Omega$). While not shown, the bus 100 also includes a ground line and may have an optional +Vcc line. Node 102 is shown with a microcontroller 102$a$ (or digital signal processor) that runs a CAN controller function 102$b$. The CAN controller 102$b$ sends and receives bits on the bus 100 via a CAN transceiver 102$c$. The other nodes 103, 104 may be similarly configured. While not shown, the nodes 102-104 may include sensors that provide message data to other nodes via the bus 100. The nodes 102-104 are bit-synchronized and transmit messages according to a predetermined content-based arbitration protocol. The nodes 102-104 use bit stuffing to avoid long runs of 0s or 1s.

Node 104 is not directly coupled to the bus 100, but is coupled via STC 106. As will be shown in greater detail below, the STC 106 acts as a proxy for the bus 100 such that any CAN-compatible node device can be coupled to the STC 106. Similarly, the STC 106 appears on the bus as a proxy for the node 104, and may be configured to be a proxy for more than one such node. When the node 104 is operating normally, the STC 106 operates as a pass-thru, although may gather statistics on the node 104. A controller device, here shown as monitor 108, can gather these statistics from this and other STCs 106. The statistics may include the number and/or frequency of messages sent, message history (depending on buffer sizes), electrical performance of the node's bus interface, etc. The monitor device 108 may communicate with the STC 106 in-band via the bus 100 or out of band via some other communications channel.

The STC 106 may be programmed to know acceptable behavior of node 104. For example, the STC 106 may at least know the message headers that define priority for the node's message. If the node 104 attempts to transmit a message on the bus that is outside this acceptable range, the STC 106 can suppress sending of at least that message by not sending any further dominant bits allowing other nodes to arbitrate. The STC 106 can allow the node 104 to transmit normally, but if a pattern of out-of-bound behavior occurs, the STC 106 may prevent the node 104 from further transmissions, and send an alert to the monitor device 108.

The STC 106 may be preprogrammed with a profile of the node 104 or nodes it is controlling. This may be part of the initial system design and may include details such as allowable message types, data gathering defaults, actions to take for improper behavior, etc. In other embodiments, the STC 106 may use machine learning to determine the normal bounds of the node's behavior. This may involve initially running in a passive mode, assuming that a newly installed node will behave properly and failures or comprimisation would likely occur after some time has passed. This may still require the STC be preconfigured with some system knowledge, e.g., certain error or high-priority messages that would seldom be encountered but would be allowable by the node.

Figure 2:
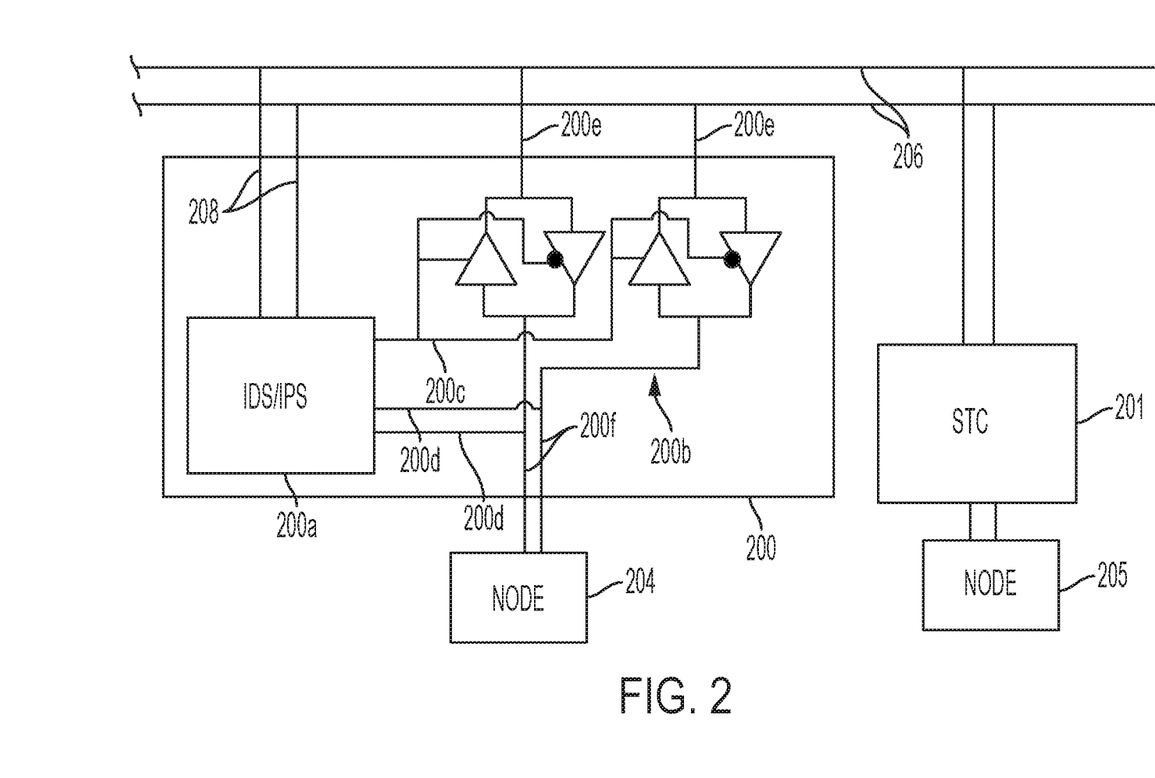
FIGS. 2 and 3 are a block diagram of apparatuses according example embodiments.

In FIG. 2, a diagram shows multiple STC apparatuses 200, 201 coupled to a bus 206 according to an example embodiment. Each STC 200, 201 may be considered a port to respective node devices 204, 205 and may maintain a separate per-port state. The STCs 200, 201 may report and be controlled by a controller/monitor device as shown in FIG. 1. The STCs 200, 201 can enforce a minimum priority on behalf of devices 204, 205 and can shut down all communications from the devices 204, 205 and/or selected, corrupt packets from the devices 204, 205.

Each of the STCs 200, 201 may include one or both of an intrusion detection system (IDS) and intrusion prevention system (IPS). As seen with STC 200, the IDS/IPS 200a is coupled to a transceiver interface circuit 200b that is located between the node 204 and the CAN bus 206. Transceiver interface circuit 200b is a notional electrical interface and may not represent a complete circuit, e.g., other components may be added to interface with the bus 206. The transceiver interface 200b circuit has a first CAN bus interface 200e configured to communicate with the CAN bus 206 and a second CAN bus interface 200f configured to communicate with the node device 204 using a CAN bus specification. The second CAN bus interface 200f is electrically separable from the first CAN bus interface 200e.

The IDS/IPS 200a can re-write every bit sent from and to the node 204 by activating an enable line 200c coupled to the transceiver interface circuit 200b. The transceiver interface circuit 200b can float a "0" to a "1" and dominate a "1" to a "0." By monitoring the output of device 204 via bus lines 200d, the IDS/IPS 200a can sense if the node device 204 is on/off and send traps. The lines 200d can also be used to detect interruptions in wiring of the device.

In this example, control of IDS/IPS 200a is provided in-band via the bus 206. This can be accomplished, for example, by sending query messages to the STC 200 via the bus 206 and the STC 200 responding via the bus 206 with a response message. Or the STC 200 could send out status messages asynchronously. In either case, the node device 204 may receive those messages or be isolated from those messages. Among other things, the control messages communicated by the STC 200 may include any combination of a command to enable or disable the node device 204, a summary of statistics describing operation of the node device 204, and a command to cause the node device 204 to perform a self-test. The IDS/IPS control/status messages can be sent/received on the bus 206 via the circuit 200b, or as indicated by lines 208, can be sent directly from the IDS/IPS block 200a to the bus.

The STCs 200, 201 allow a per-drop management interface for multiple node devices 204, 205. The STCs 200, 201 can enforce minimum/maximum priorities, enforce message types and payloads, and prevent DoS attacks. By utilizing in-band communications, the STCs 200, 201 can be easily adapted into existing CAN networks through the incorporation of the additional commands used by the STC into the messages used on the CAN network. The STCs 200, 201 can operate autonomously, automatically shutting off messages from the nodes 204, 205 if a violation is detected. In other cases, the STCs 200, 201 may report error conditions or message violations (e.g., a corrupted message that would not likely to cause a DoS condition) without shutting off the node. In such a case another device, such as a system main controller, can decide how to deal with the condition or violation and communicate the response back to the STC 200, 201.

Figure 3:
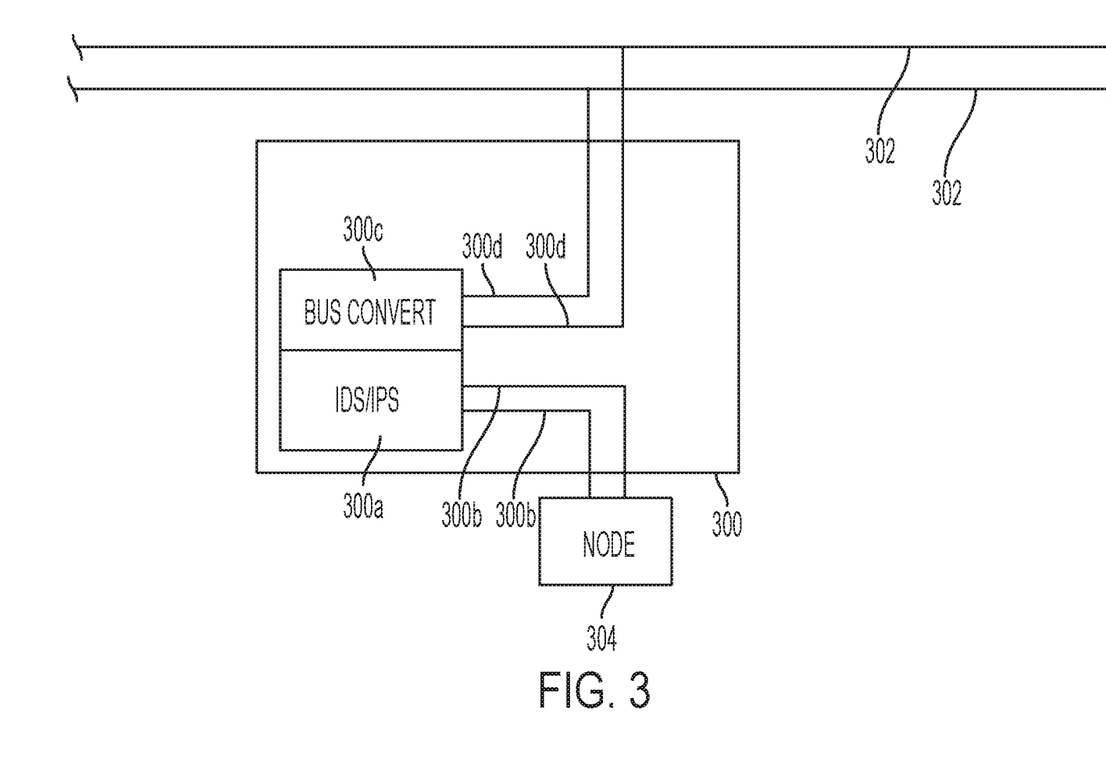

In some configurations, an STC can use an enhanced interconnector backbone, such as CAN FD or a backbone that is protected with CANCrypt. In FIG. 3, a diagram shows an STC 300 on a bus 302 according to an example embodiment. The bus 302 may utilize CAN FD, CANCrypt, or other such later version or adaptation of the CAN protocol. The STC 300 includes an IDS/IPS 300a similar to that described in FIG. 2. A node device 304 is coupled to a legacy CAN bus interface 300b of the STC 300, e.g., using CAN 2.0 or the like. A bus conversion module 300c includes a second bus interface 300d coupled to the backbone bus 302. The bus conversion module 300c translates data between the protocols of the different busses 302, 300b. This translation may include encryption/decryption and changing a speed of the transmission. Note that in alternate embodiments the bus interface 300b may be faster than bus 304 and/or the bus interface 300b may use encryption while the bus 304 does not.

When converting between encrypted and non-encrypted busses, the STC 300 may utilize buffering and/or delaying of the device 304. Generally, CANCrypt uses two packets: a first preamble packet followed by a secured packet. If the node device 304 is communicating via non-encrypted protocol, the device will send the packet to the IDS/IPS 300a and/or conversion module 300c, which will thereafter keep the node device 304 busy by winning arbitrations. This gives the conversion module 300c sufficient time to encrypt the data, form the two packets, and transmit the two packets on the bus 302. If the node device 304 is communicating via an encrypted protocol and the bus 302 is not, then the STC 300 may encrypt the data, form the two packets, and transmit the two packets to the node device 304. Any messages received for the node 304 during this process may be buffered or dropped depending on the system parameters and buffer size of the STC 300.

Note that the interface 300b may be non-encrypted while bus 302 is encrypted. In such a case, security between the STC 300 and node 304 may be enforced via physical proximity and mechanical/electrical protection of the bus lines of the interface 300b, e.g., hard conduit, extra shielding, etc. Further, the translation module 300c and/or the IDS/IPS 300a may also prevent any encrypted or decrypted data transmitted on the bus 302 from reaching the node 304 except for messages that are directly targeted for the node 304, if any. If a significant number of messages are targeted from the bus 302 to the node 304 and the bus 302 has a significantly higher speed than interface 300b, then the translation module 300c and/or the IDS/IPS 300a may be equipped with buffers sufficient to temporarily queue messages targeted to the node 304 while they are being transferred over the slower interface 300b.

Figure 4:
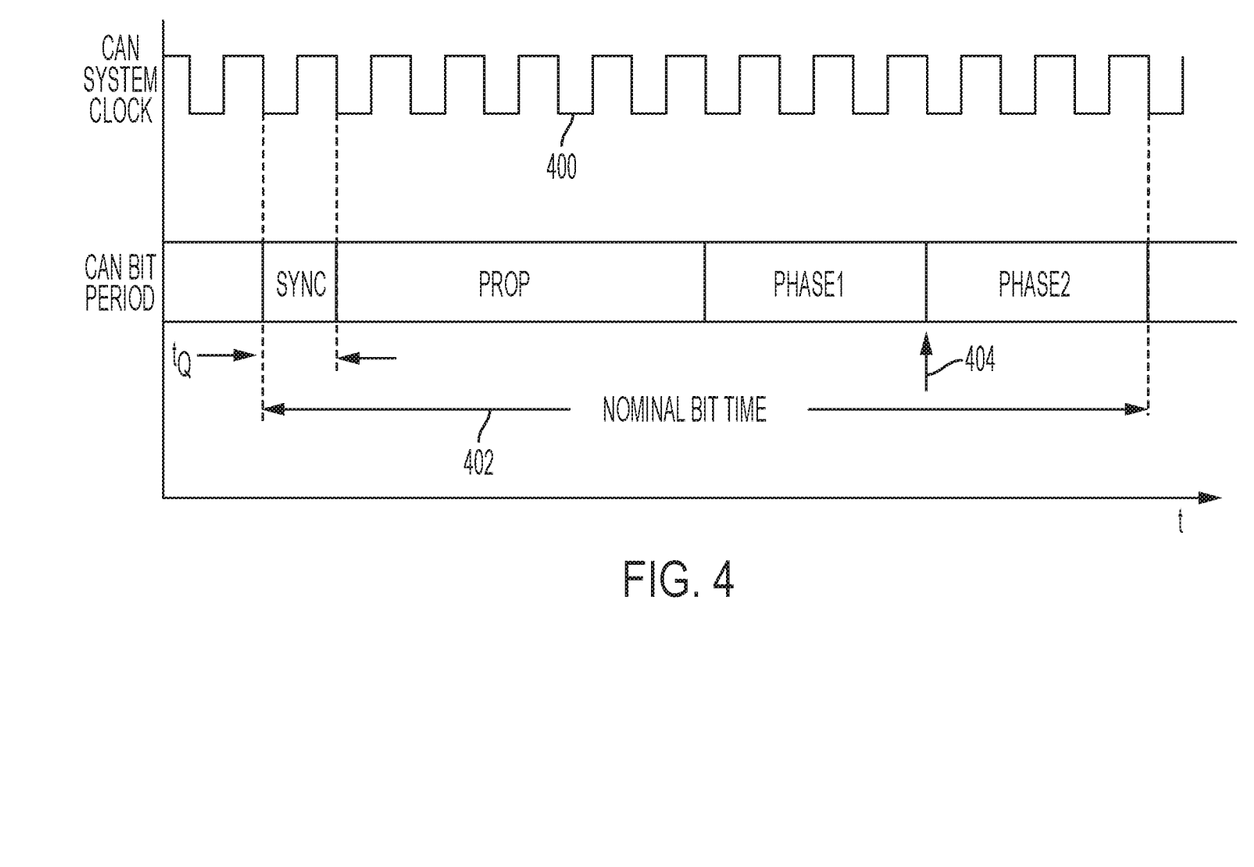
FIG. 4 is a signal diagram showing bit timings used by an apparatus according to an example embodiment.

In FIG. 4, a diagram illustrates CAN sampling as would be used by an STC according to an example embodiment. Square wave 400 represents a system clock that is used by all nodes on the CAN network. The value $t_Q$ represents a time quantum, which is a minimum unit of time on the bus and is equal to one period of the system clock 400. The actual internal clocks used by the processing circuits may run at frequencies that are multiples of the frequency of the system clock 400. Time 402 represents the time period during which a bit is transmitted on the bus. The system designer can program different values of the PROP, PHASE1, and PHASE2, which therefore affects the nominal bit time 402. For example, the PROP segment may be set between one and eight times $t_Q$.

The arrow 404 represents a sample taken by the node to read the actual bit value. There may be more samples take, e.g., two samples taken prior to sample 404. There will be various propagation delays between nodes on the bus, so the sampling is taken in the latter part of the bit time 402 to ensure the value read by the samples 404 corresponds to the sum of all bits being transmitted. If more than one sample is taken, the majority of sample values is used, e.g., majority value of two out of three sample is used as the sampled value.

The actual value of $t_Q$ may be around 100-150 nsec, depending on the specific CAN implementation. Specific device transceivers may have around 30-130 nsec differential rise time. High speed digital isolators may add another ~10 nsec delay. This allows an STC around 10-90 nsec during SYNC to compute the result of what the node device is transmitting and decide whether or not to allow transmission. If the PROP and PHASE1 segments are particularly long, this may allow additional time to detect the value transmitted by the node. Thus, in a configuration such as shown in FIG. 2, the STC can do a per-bit detection of node transmissions during SYNC, and float or dominate the transceiver accordingly.

In other embodiments, the STC may float the bus transceiver to enforce arbitration priority without detecting what node device sends. This allows relaxing timing margins when transmitting to the bus. The full message can be buffered by the STC, and the STC logic can then decide if the node device is transmitting an allowable message, e.g., based on the actual value of the arbitration field that was attempted to be transmitted by the node. If so, the STC can transmit the message onto the bus at the next opportunity.

Figure 5:
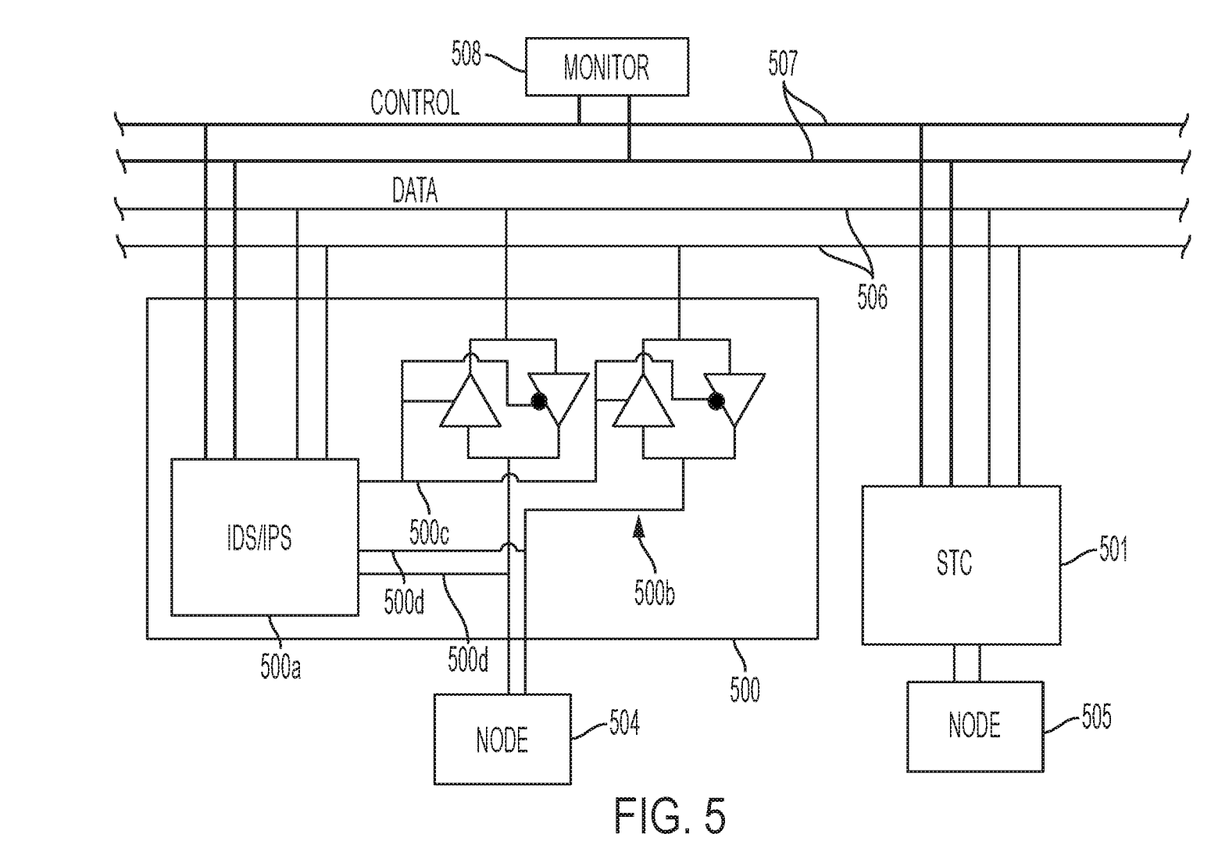
FIGS. 5 and 6 are a block diagram of apparatuses according example embodiments.

In FIG. 5, a block diagram shows multiple STCs 500, 501 on data and control busses 506, 507 according to an example embodiment. Each STC 500, 501 acts as a port to respective node devices 504, 505 and maintains a separate per-port state. The STCs 500, 501 may report and be controlled by a single controller/monitor device 508 that is coupled to the control bus 507. The control bus 507 is separate and independent from data bus 506 and may use the same or different protocols and electrical characteristics. For example, the control bus 607 may use any of the CAN protocols mentioned herein or use a non-CAN protocol, such as Ethernet, I²C, wireless networking, etc. The STCs 500, 501 can enforce a minimum priority on behalf of devices 504, 505 on the data bus 506 as previously described.

Each of the STCs 500, 501 include one or both of an IDS and IPS. As seen with STC 500, the IDS/IPS 500a is coupled to a transceiver interface circuit 500b that is located between the node 504 and the CAN bus 506. By monitoring the output of device 504 via bus lines 500d, the IDS/IPS 500a can sense if the node device 504 is on/off, send traps, detect interruptions in wiring of the device 504 via enable line 500c.

In this example, control of IDS/IPS 500a is provided out-of-band via the control bus 507. This can be accomplished, for example, by sending query messages to the STC 500 via the bus 507 and the STC 500 responding via the bus 507 with a response message. Or the STC 500 could send out status messages asynchronously and may or may not accept any control commands. In either case, the node device 504 may be isolated from those messages. In other configurations, the control bus 507 may be used to target messages just to the node device 504 that will not be sent out to other devices on the data bus 506. For example, the monitor 508 could initiate a self-test on selected ports via the control bus 507 without increasing traffic on the data bus 506. Any messages generated by the node devices 504, 505 in response to these self-test requests can be isolated from the data bus 506 as well.

Figure 6:
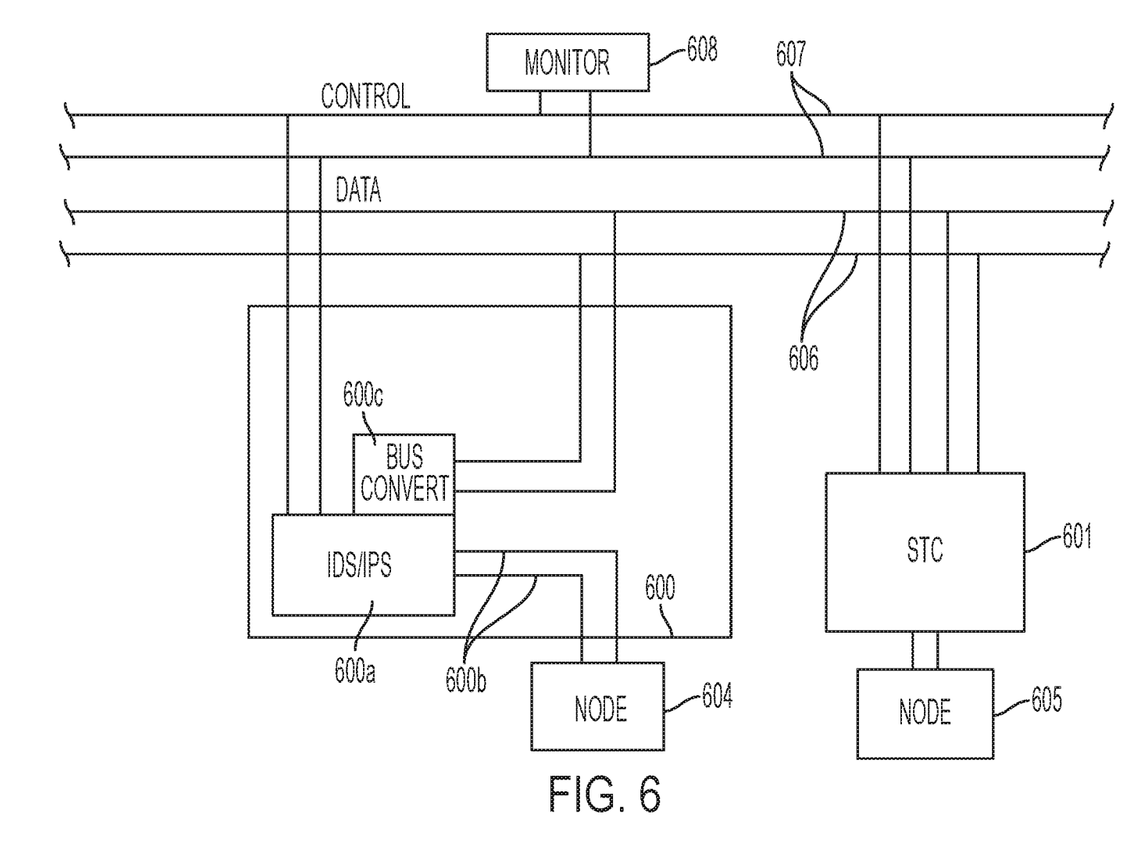

In FIG. 6, a block diagram shows multiple STCs 600, 601 on data and control busses 606, 607 according to another example embodiment. Each STC 600, 601 acts as a port to respective node devices 604, 605 and maintains a separate per-port state. The STCs 600, 601 may report and be controlled by a single controller/monitor device 608 that is coupled to the control bus 607. The control bus 607 is separate and independent from data bus 606 and may use the same or different protocols and electrical characteristics. Further, the devices 604, 605 use a different type of bus 600b than the data bus 606. The STCs 600, 601 can enforce a minimum priority on behalf of devices 604, 605 on the data bus 606 as previously described.

Each of the STCs 600, 601 include one or both of IDS and IPS. As seen with STC 600, the IDS/IPS 600a is coupled to a bus converter 600c that is located between the node 604 and the CAN bus 606. The busses 606, 600b may use different formats selected from CAN 2.0, CANCrypt, and CAN FD. As described with the example shown in FIG. 3, the converter 600c may translate between encrypted and unencrypted messages and change a speed of the transmission between the types of busses 600b, 606.

In this example, control of IDS/IPS 600a is provided out-of-band via the control bus 607 as described with the embodiment shown in FIG. 5. The control bus 607 can be the same type of bus than any of busses 600b, 606 or may be the same as one of them. The control bus 607 may alternatively use a non-CAN protocol, such as Ethernet, I²C, etc. The data of the control bus 607 can be isolated from one or both of the busses 600b, 606.

Figure 7:
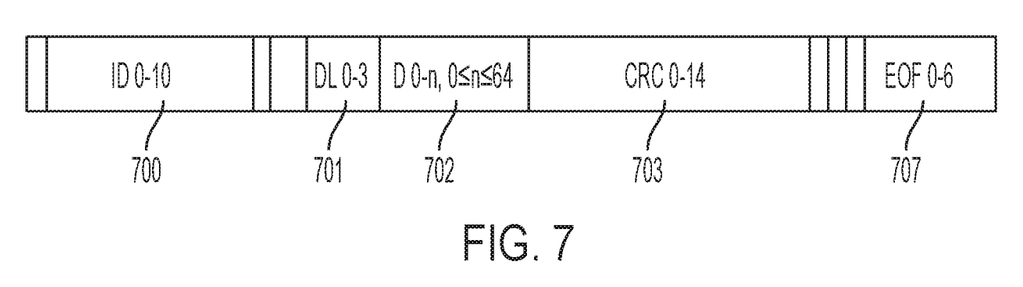
FIG. 7 is a block diagram of a message used by an apparatus according to an example embodiment.

As noted above, an STC determines whether or not a node device is transmitting a message that is allowed for the node device, and does not allow transmission if not allowed. In FIG. 7, an example message format is shown that illustrates a number of ways in which an STC according to example embodiments may determine whether or not a message is allowed. The format shown in FIG. 7 corresponds to what is known as the base frame format described in CAN 2.0, but the concepts described in regards to this figure can be applied to other CAN formats, e.g., extended frame format. The illustrated message includes a message ID field 700, a data length field 701, a data field 702, a cyclic redundancy check (CRC) field 703, and an end of frame (EOF) field 704. Other fields can be seen in FIG. 7 but are not described, such as start of frame and delimiter bits.

The ID field 700 both identifies the messages and arbitrates priority. For example, a particular sender and particular type of message payload may have a unique identifier. Further, the order of bits in the ID field 700 determine priority. In the typical CAN convention, a zero is considered a dominant bit that is transmitted by one of the nodes putting the bus in a dominant state, e.g., switching the CANH and CANL to +5 V and 0V respectively. Each node that is transmitting will assert a dominant state on the bus for each zero in their message. For each one in their message, the node will let the bus float (also referred to elsewhere herein as transmitting a recessive bit) and see if a dominant state is asserted. If so, then a node with higher priority has won arbitration and the nodes that lost arbitration will enter a listen mode where the bus is allowed to float. The node will attempt to retransmit in later message window when the current message is complete.

With this in mind, the messages with the most leading zeros in the ID field 700 will have the highest priority and those messages will face the least delay in transmission. Therefore, an STC can know of the highest maximum priority allowed for a node, and any attempt to transmit a message ID 700 higher than this priority may result in the STC blocking the message. However, the STC may also know the full set of allowable message IDs 700 that can be transmitted by the node device. Therefore, the STC may also block a message with an ID field 700 that is not in this range, even if the message ID has a priority is less than the maximum allowed by the node.

The STC may also have knowledge of other aspects of the allowed message formats beyond that of the ID field 700. For example, the node device may be limited to message payload size (contained in data field 702) below the maximum value of the data length field 701, which defines the size of the data field 702 in bytes. Thus, if the node sends a value of data length field 702 is greater than this maximum allowed value, this could also be an indicator that the node is behaving abnormally. Similarly, the EOF field 703 should be six recessive bits, and transmission of a dominant bit in this field 703 could be an indicator that the node is behaving abnormally. Other CAN conventions, such as bit stuffing, may also be enforced by the STC.

Assuming the node device has attempted to transmit an allowed message and behaved correctly when losing arbitration based on the ID field 700, the STC may still monitor the activity of the node during the rest of the message transmission and record instances where the node tries to assert any dominant bits where it was not supposed to. Or, the STC may not monitor the node but may just float the bus interface during the appropriate intervals during the rest of the message. In either case, the STC will prevent the node device from transmitting a dominant bit on the bus subsequent to losing the arbitration.

Figure 8:
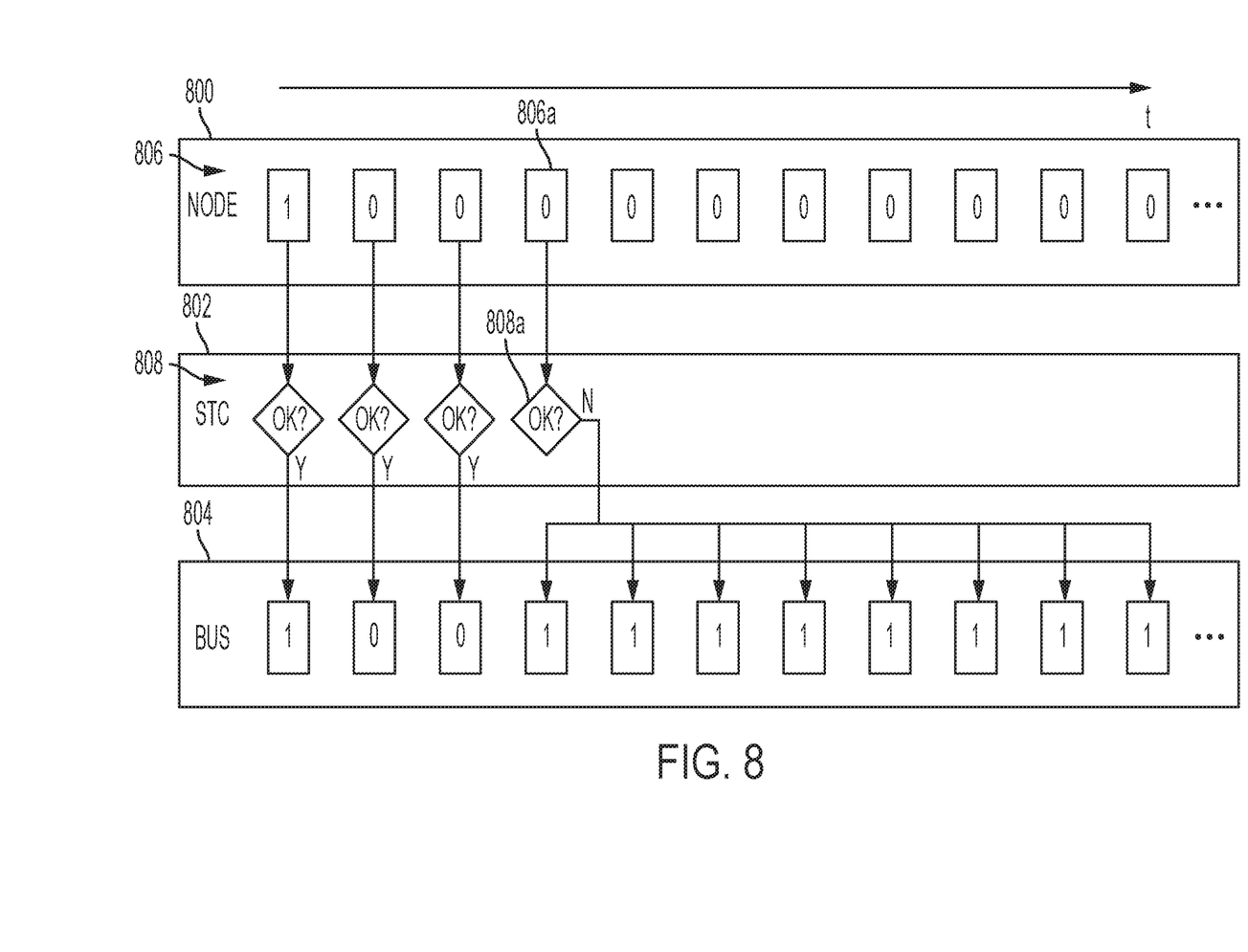
FIG. 8 is a diagram illustrating a bit checking procedure according to an example embodiment.

In FIG. 8, a diagram illustrates an example of how STC logic 802 can determine allowable message bits according to an example embodiment. A node device 800 is sending a sequence of bits 806 via a bus interface between the STC 802 and the node 802. For purposes of this example, the bits 806 are an 11-bit message ID field, although the concepts may be applicable to any parts of the message frame monitored by the STC 802. The STC 802 has another bus interface that is coupled to a CAN bus 804. The two bus interfaces may be of the same or different type of CAN bus. For each of the bits 806, the STC makes a decision as indicated by decision blocks 808. As each bit is allowed, it is transferred to the bus 804. As indicated by the return value of decision block 808a, dominant bit 806a is not allowed for this node device 800. This determination 808a may take into account the previous three bits already transmitted onto the bus 804. Due to the determination 808a being negative, the STC 802 floats the bus so that no more dominant bits are transmitted, which stop further transmission of the message from the node device 800. The STC 802 may record the bits subsequent to bit 806a for logging purposes while not using the bits for any transmission decisions.

In this example, the decision that the bit 806a was not allowed may be because it has a higher priority than what the node 800 is allowed to send onto the bus 804. For example, if the highest allowed priority message ID is {1,0,0,1,0,0, 0,0,0,0,0} the illustrated bit sequence 806 would violate that priority. It also may be that the message ID encoded in the bits does not violate a maximum priority but is not in a set of message IDs allowed by the node. For example, if the node 800 can send a high-priority message with a leading zero, then bit sequence 806 has a lower priority than that high-priority message, but the sequence 806 may still not be within the message ID set allowed to be sent by the node 800.

The decision blocks 808 may be implemented in a number of ways. For example, to determinate allowable message IDs, a finite state machine can be constructed in software or hardware that provides a binary output (yes or no) for a sequence of bits. The state machine will output a 'yes' for each bit until an unallowable sequence is encountered, then a 'no' is output. In another example, the allowed message IDs of the node 800 can be enumerated, and each bit sequence can be compared against all or part of these message IDs. An example of this is shown in Table 1 for five 11-bit IDs, where the bits are transmitted from left to right.

TABLE 1

| Allowed message IDs | | | | | | | | | | | |
|---|---|---|---|---|---|---|---|---|---|---|---|
| ID1 | 1 | 0 | 0 | 1 | 0 | 0 | 1 | 0 | 0 | 1 | 1 |
| ID2 | 1 | 0 | 1 | 0 | 0 | 1 | 1 | 0 | 0 | 0 | 0 |
| ID3 | 1 | 1 | 0 | 1 | 0 | 1 | 1 | 0 | 1 | 1 | 0 |
| ID4 | 1 | 1 | 1 | 0 | 0 | 0 | 0 | 0 | 1 | 1 | 0 |
| ID5 | 1 | 1 | 1 | 0 | 0 | 0 | 0 | 0 | 1 | 1 | 1 |

In one example, each row can be held in memory, and the n-bits of the transmitted ID can be logically compared with the leading n-bits of the ID in each row. For the first bit in this example, this will result in a negative only if the leading bit transmitted by the node device is a zero. For the next transmitted bit, a 2-tuple of the first two transmitted bits are compared against the 2-tuples formed from the first two columns of bits in the table. In this case, this will always return true, because it is already assumed the first bit is one (the comparison would not continue otherwise) and so the only possibilities for the first two transmitted bits are {1,0} and {1,1}, both of which are in the list. The same is true for the 3-tuple formed of the first three transmitted bits. However, there are a number of disallowed combinations of the first four bits, such as {1,0,0,0} and {1,1,1,1}. Looking at n-tuples instead of the full ID may allow for some optimization rather than masking and comparing each message ID, although is more complicated to implement. Similarly, in some cases, determination can be made base on a single bit. For example, in Table 1, there is only one allowed bit value for the first, fifth, and eighth columns. It will be understood that there may be more efficient ways to perform prefix matching. For example, a ternary search tree or other prefix matching data structures may be used. Another option is to use an interval graph to represent valid ranges of transmissions.

Figure 9:
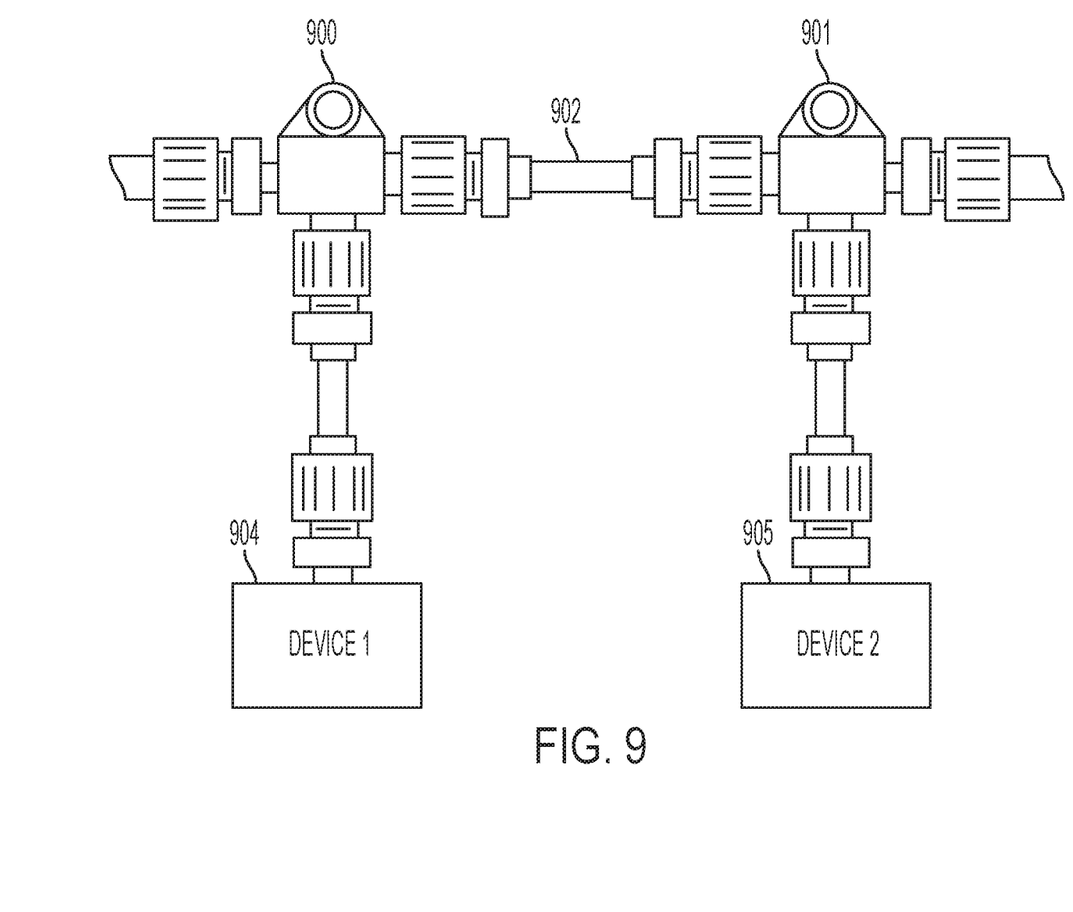
FIG. 9 is a top view showing mechanical features of an apparatus according to an example embodiment.

An STC as described herein is electrically and protocol-compatible with existing CAN standards, and so can be used with existing CAN hardware and busses. This compatibility can extend to mechanical compatibility, as shown in the top view of FIG. 9. Two STCs 900, 901 are shown coupled to a CAN bus 902 and two node devices 904, 905. The STCs 900, 901 include a housing and connectors that may be mechanically interchangeable with standard T-connectors that tie node devices 904, 905 directly to the bus 902. This can allow for an easy mechanical and electrical retrofit of legacy systems to include the functionality of the STCs 900, 901.

Figure 10:
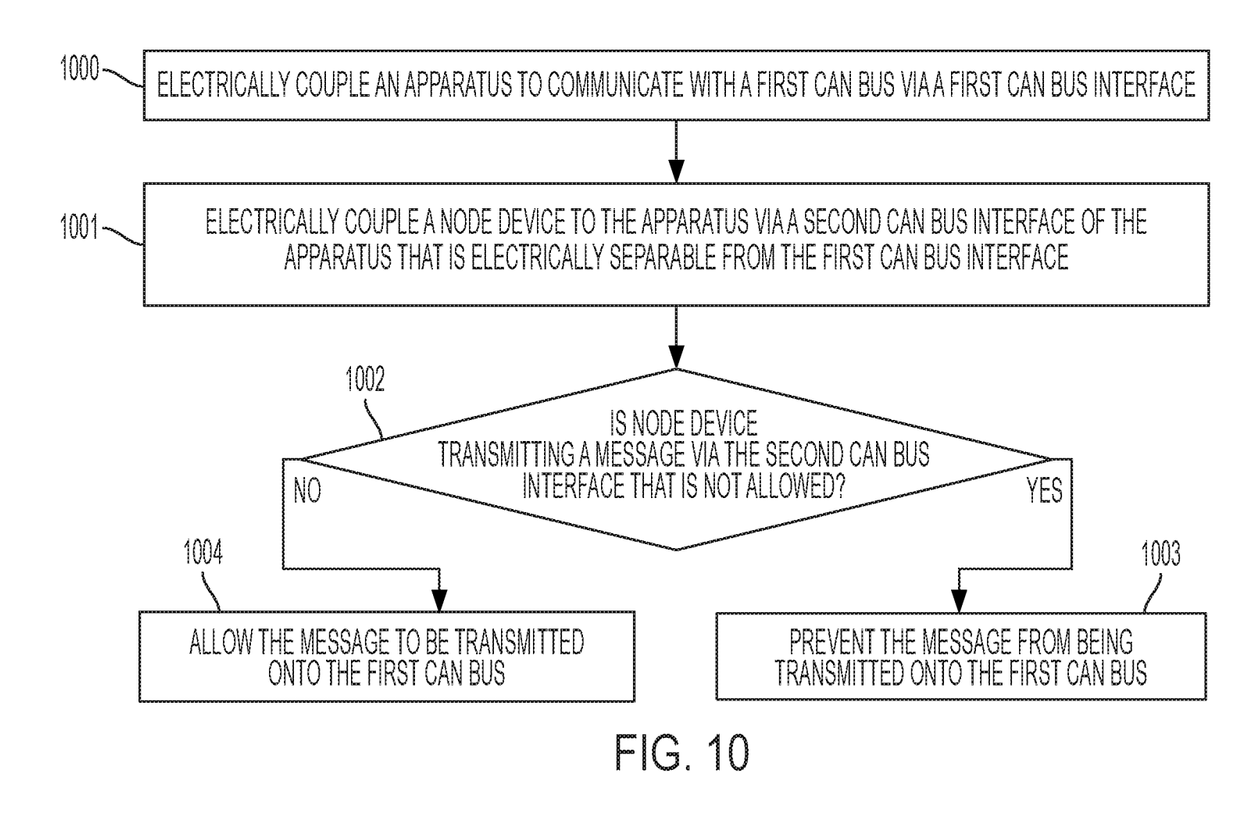
FIG. 10 is a flowchart of a method according to an example embodiment.

In FIG. 10, a flowchart shows a method according to an example embodiment. The method involves electrically coupling 1000 an apparatus to communicate with a CAN bus via a first CAN bus interface. A node device is electrically coupled 1001 to the apparatus via a second CAN bus interface of the apparatus that is electrically separable from the first CAN bus interface. At block 1002, it is determined via the apparatus whether the node device is transmitting a message via the second CAN bus interface that is not allowed for the node device. If so, the message is prevented 1003 from being transmitted onto the first CAN bus, otherwise is allowed 1004 to be transmitted.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. An apparatus, comprising:
a first bus interface coupled to communicate with a first controller area network (CAN) bus;
a second bus interface coupled to communicate with a node device, the node device configured to communicate with a second CAN bus; and
a logic circuit coupled between the first and second bus interfaces, the logic circuit operable to:
read each bit of a message sent from the node device via the second bus interface as each bit is transmitted onto the first CAN bus via the second CAN bus;
during a first time quantum of a bit period of each bit, determine that a current bit of the message indicates that the message is not allowed for the node device; and before the current bit can be detected on the first CAN bus, prevent the current bit and subsequent bits of the message from being transmitted onto the first CAN bus in response thereto.

2. The apparatus of claim 1, wherein determining that the message is not allowed for the node device comprises determining that the message exceeds a maximum arbitration priority allowed for the node device.

3. The apparatus of claim 1, wherein determining that the message is not allowed for the node device comprises determining that the message has a message identifier field not allowed for the node device.

4. The apparatus of claim 1, wherein the logic circuit communicates control message that include at least one of:
a command to enable or disable the node device;
a summary of statistics describing operation of the node device; and
a command to cause the node device to perform a self-test.

5. The apparatus of claim 4, wherein the logic circuit communicates the control messages via the first CAN bus.

6. The apparatus of claim 4, wherein the logic communicates the control messages via a communications channel that is independent of the first and second CAN busses.

7. The apparatus of claim 1, wherein the first and second CAN busses utilize a common CAN standard.

8. The apparatus of claim 1, wherein the first and second CAN busses utilize a different CAN standard.

9. The apparatus of claim 8, wherein the first CAN bus is a CANCrypt bus and data of the second CAN bus is not encrypted, the logic circuit further operable to:
determine that the message is allowed for the node device;
in response thereto, encrypt and send the message in a multiple message format on the CANCrypt bus; and
prevent the node device from transmitting during the encryption and sending by denying the node device access to the second CAN bus via arbitration.

10. The apparatus of claim 1, wherein the logic circuit is further operable to:
determine that the message is allowed for the node device but that the node device has lost arbitration to another message on the first bus while the node device is transmitting the message; and
prevent the node device from transmitting a dominant bit on the first bus subsequent to losing the arbitration while the other message is being transmitted.

11. A method comprising:
electrically coupling an apparatus to communicate with a first controller area network (CAN) bus via a first CAN bus interface;
electrically coupling a node device to the apparatus via a second CAN bus interface of the apparatus that is electrically separable from the first CAN bus interface;
read each bit of a message sent from the node device as each bit is transmitted onto the first CAN bus interface via the second CAN bus interface;

during a first time quantum of a bit period of each bit, determining that a current bit of the message indicates that the message is not allowed for the node device; and before the current bit can be detected on the bus, preventing the current bit and subsequent bits of the message from being transmitted onto the first CAN bus in response thereto.

12. The method of claim 11, wherein determining that the message is not allowed for the node device comprises determining that the message exceeds a maximum arbitration priority allowed for the node device.

13. The method of claim 11, wherein determining that the message is not allowed for the node device comprises determining that the message has a message identifier field not allowed for the node device.

14. The method of claim 11, further comprising receiving a command at the apparatus to control the node device and controlling the node device in response thereto.

15. The method of claim 14, wherein the command is received via the first CAN bus.

16. The method of claim 14, wherein the command is received via a communications channel that is independent of the first and second CAN busses.

17. The method of claim 11, further comprising:
determining that the message is allowed for the node device but that the node device has lost arbitration to another message on the first CAN bus while the node device is transmitting the message; and prevent the node device from transmitting a dominant bit on the first CAN bus subsequent to losing the arbitration while the other message is being transmitted.

18. An apparatus, comprising:
a transceiver interface circuit configured to selectively couple and decouple a node device from a controller area network (CAN) bus; and
a logic circuit coupled to the transceiver interface circuit, the logic circuit operable to:
detect an output signal of the node device during each bit of a message transmitted by the node device, each bit transmitted during a nominal bit time that starts with a SYNC segment;
determine whether values of the output signal during the SYNC segment of each bit represents part of a disallowed message; and
if any of the values of the output signal represent part of the disallowed message, float the transceiver interface to prevent further transmission of the disallowed message onto the CAN bus.

19. The apparatus of claim 18, wherein the determination that the values of the output signal further occurs after an end of the SYNC segment but before the values can be detected on the CAN bus.

20. The apparatus of claim 18, wherein a time period of the SYNC segment is a time quantum of the CAN bus.

* * * * *